United States Patent [19]

McCoy

[11] Patent Number: 5,884,931
[45] Date of Patent: Mar. 23, 1999

[54] SELF-LOCKING HITCH BALL

[75] Inventor: Richard McCoy, Granger, Ind.

[73] Assignee: Reese Products, Inc., Elkhart, Ind.

[21] Appl. No.: 729,118

[22] Filed: Oct. 11, 1996

[51] Int. Cl.⁶ .................................................... B60D 1/06
[52] U.S. Cl. ............................................................ 280/511
[58] Field of Search .................................. 280/511, 504, 280/507; 411/424, 351, 166; 29/525, 525.02, 525.03

[56] References Cited

U.S. PATENT DOCUMENTS

| | | | |
|---|---|---|---|
| 1,988,925 | 1/1935 | Thompson | 411/424 |
| 1,996,128 | 4/1935 | Thompson | 29/107 |
| 3,650,546 | 3/1972 | Koenig | 280/512 |
| 3,679,234 | 7/1972 | Colliau | 280/511 |
| 4,938,496 | 7/1990 | Thomas et al. | 280/511 |
| 4,993,739 | 2/1991 | Putnam | 280/511 |
| 5,040,817 | 8/1991 | Dunn | 280/511 |
| 5,085,452 | 2/1992 | Janeiro | 280/511 |
| 5,158,316 | 10/1992 | Hutchmacher | 280/511 |

FOREIGN PATENT DOCUMENTS 2038259  7/1980  United Kingdom .

*Primary Examiner*—Kevin Hurley
*Attorney, Agent, or Firm*—King and Schickli

[57] ABSTRACT

A self-locking hitch ball assembly includes a hitch ball, a mounting shank extending from the hitch ball and a locking element along the shank for cutting a mating periphery in a hitch ball receiving and carrying member to which the hitch ball assembly is mounted. A fastener is provided for engaging the mounting shank so as to secure the hitch ball assembly in position.

11 Claims, 2 Drawing Sheets

SELF-LOCKING HITCH BALL

TECHNICAL FIELD

The present invention relates generally to the towing field and, more particularly, to a trailer hitch receiver including a hitch ball that is locked in position on a hitch ball receiving and carrying member such as a ball mount head or draw bar to prevent relative rotation between the mounting stem or shank of the hitch ball and the carrying and receiving member.

BACKGROUND OF THE INVENTION

Trailer hitches including a hitch ball for connecting a towing vehicle to a trailer have long been known in the art. Examples of such are disclosed in a number of patents including, for example, U.S. Pat. No. 3,482,856 to Reese; U.S. Pat. No. 3,694,006 to Goode et al.; U.S. Pat. No. 3,768,837 to Reese; U.S. Pat. No. 4,033,601 to Lindahl et al. and U.S. Pat. No. 5,375,867 to Kass et al.

Most hitch balls are either directly mounted to a draw bar or a ball mount head carried on a hitch bar by means of a threaded mounting shank and cooperating locking nut or nut and lock washer. More specifically, the threaded mounting stem extends through an aperture in the draw bar/ball mount head and the locking nut or nut and locking washer are snugly tightened against the draw bar/ball mount head to secure the trailer hitch ball in position. While this provides a very adequate connection, many individuals are frustrated when the threaded mounting shank of the hitch ball rotates in the ball mount head when attempting to tighten the securing nut. When this occurs, it is not possible to complete the tightening operation unless tools are employed to prevent this from happening.

One way of addressing this problem is disclosed in U.S. Pat. No. 5,040,817 to Dunn. In Dunn, the pedestal or upper portion of the hitch ball mounting shank includes wrench flats that allow the ball to be held in position with a wrench during the nut tightening operation. While this is a functional solution to the problem, it must be appreciated that this involves the manipulation of two tools, one wrench to secure the hitch ball mounting shank from rotation and one wrench to tighten the securing nut. Many individuals find the manipulation of two tools inconvenient or difficult. Further, two appropriate tools are not always readily available to allow the connection to be made.

Another approach to address this problem is disclosed in co-pending U.S. patent application Ser. No. 08/575,417, filed Dec. 20, 1995, entitled "Trailer Hitch Receiver With Hitch Ball Lock", also assigned to the assignee of the present invention. This document discloses a trailer hitch receiver including a hitch bar, a ball mount head, a hitch ball with a threaded mounting stem or shank and a fastener for securing the hitch ball to the ball mount head. More specifically, the ball mount head includes a mounting aperture with a sidewall defining an acircular outline. The mounting shank of the hitch ball includes a locking element for engaging within the sidewall defining the acircular outline. As a result of this structural relationship, rotation of the hitch ball mounting shank relative to the ball mount head is prevented so that the fastener may be easily secured thereto and tightened to hold the hitch ball in position.

While such a trailer hitch receiver design is fully effective to allow simple and convenient hitch ball mounting, it should be appreciated that both the draw bar/ball mount head receiving the hitch ball and the hitch ball shank must be designed for cooperative engagement. Hence, this approach is not appropriate for retrofit and cannot be used to successfully address this problem on equipment already in the field.

Recognizing these and other shortcomings, a need is hereby identified for an improved structural arrangement whereby a mounting stem of a hitch ball may be secured against rotation relative to the draw bar/ball mount head during connection of the hitch ball thereto.

SUMMARY OF THE INVENTION

Accordingly, it is a primary object of the present invention to provide a system for securing a hitch ball to a hitch ball receiving and carrying member that prevents rotation of the mounting shank of the hitch ball relative to that member during the installation operation in a simple and convenient manner, thereby overcoming the limitations and disadvantages of the prior art.

Yet another object of the present invention is to provide a method for preventing relative rotation between the mounting shank of a hitch ball and a draw bar/ball mount head to which the hitch ball is to be attached during the fastening of the hitch ball to the draw bar/ball mount head.

Another object of the present invention is to provide a trailer hitch wherein the mounting shank of the hitch ball includes a unique locking element for forming or cutting a mating periphery in the draw bar/ball mount head to which the hitch ball is secured so as to prevent rotation of the mounting shank relative to the draw bar/ball mount head. In this way it is advantageously possible to conveniently secure the hitch ball to the draw bar/ball mount head by means of a securing nut and by utilizing only a single tool. Further, the hitch ball including the mounting shank with the unique locking element may, advantageously, be retrofit to equipment in the field thereby allowing trailer equipment operators to receive the convenience advantages of one tool hitch ball installation without having to replace existing draw bars/ball mount heads.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a self-locking hitch ball assembly is provided. The hitch ball assembly includes a hitch ball of a type known in the art adapted for cooperative receipt in a mating socket assembly of a trailer. A mounting shank extends from the hitch ball. A locking element is provided along the mounting shank. This locking element is designed to cut a mating periphery in a hitch ball receiving and carrying member (e.g. draw bar, ball mount head of a weight distributing hitch carried by a hitch bar) to which the hitch ball assembly is mounted. Additionally, the hitch ball assembly includes a fastener for engaging the mounting shank so as to secure the hitch ball in position on the receiving and carrying member.

More specifically describing the invention, the locking element preferably includes multiple radially projecting serrations or teeth. Further, the distal end of the mounting shank is threaded and the fastener is a cooperating nut that engages the thread.

In accordance with a further aspect of the present invention, a complete trailer hitch assembly is provided. The trailer hitch assembly includes a hitch ball receiving and carrying member including a hitch ball mounting aperture. The hitch ball receiving and carrying member may, for example, comprise a draw bar or a ball mount head that is carried on a hitch bar. Both the draw bar and ball mount head are structures well known to those skilled in the art. The trailer hitch assembly also includes a hitch ball and a mounting shank extending from the hitch ball for receipt in the hitch ball mounting aperture. A locking element is provided on the shank for cutting a mating periphery in the hitch ball receiving and carrying member about the hitch ball mounting aperture.

In accordance with yet another aspect of the present invention a method is provided for preventing relative rotation between the threaded mounting shank of a hitch ball and a hitch ball receiving and carrying member. The method includes the steps of providing a radially projecting locking element along the shank having a diameter A. Next is the engaging of the threaded mounting shank in a hitch ball mounting aperture formed in the hitch ball receiving and carrying member. The hitch ball mounting aperture has a diameter B wherein diameter B is slightly less than diameter A. Next, by tightening the fastener on the threaded mounting shank this locking element cuts a mating periphery in the hitch ball receiving and carrying member about the hitch ball mounting aperture. The locking element and mating periphery engage in a manner that prevents rotation of the threaded mounting shank relative to the hitch ball receiving and carrying member.

Advantageously, this allows an individual to securely tighten the hitch ball assembly on the hitch ball receiving and carrying member using a single tool to secure the fastener with the appropriate torque. Of course, as should be appreciated, a hitch ball assembly of the type described may be retrofitted to draw bars and ball mount heads already in the field. Since the hitch ball assembly cuts its own mating periphery, the anti-rotation function will be provided. Accordingly, the present invention allows for the first time an individual to effectively address the hitch ball mounting problem (i.e. prevent rotation of the hitch ball mounting shank in the draw bar/ball mount head during installation) characteristic of equipment already in the field.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
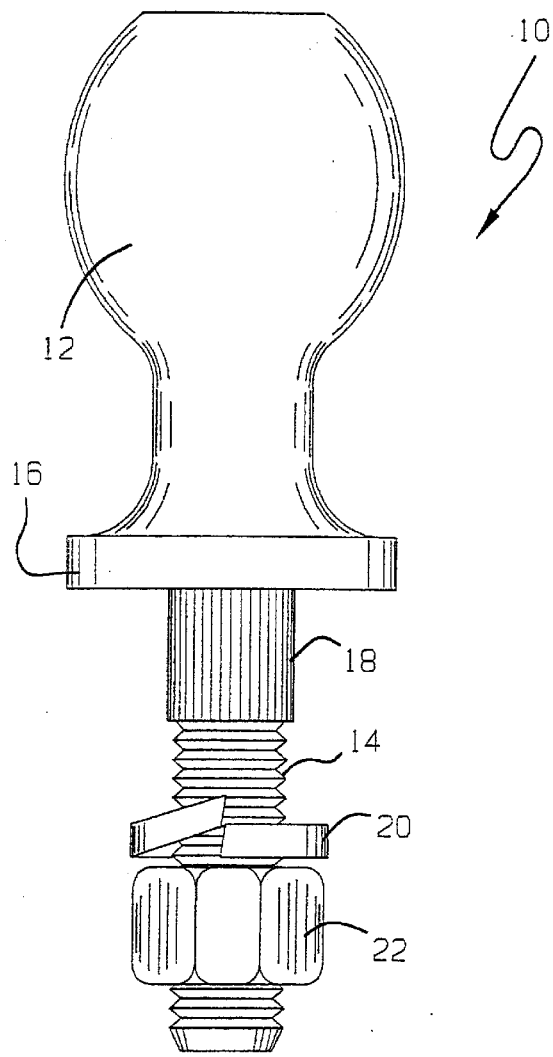
FIG. 1 is a side elevational view showing the self-locking hitch ball assembly of the present invention.

Reference is now made to FIG. 1 showing the self-locking hitch ball assembly 10 of the present invention. The hitch ball assembly 10 includes a hitch ball 12 preferably having a diameter of 1⅞, 2 or 2⁵⁄₁₆ inches. As is known in the art, such a hitch ball is adapted for receipt in a cooperating mating socket of a trailer. A threaded mounting shank 14 extends from the base 16 of the hitch ball 12. A locking element 18 is provided along the proximal end of the mounting shank 14 adjacent the base 16. A lock washer 20 and nut 22 may be cooperatively secured to the threaded mounting shank 14 to complete the self-locking hitch ball assembly 10. The lockwasher 20 and nut 22 define a fastener that engages the mounting shank 14 and is used to secure the hitch ball assembly in position. Of course, another fastener such as a lock nut may be utilized.

Preferably, the self-locking hitch ball assembly 10 is constructed from solid steel in a wide variety of sizes and finishes to fit all towing needs. Further, the hitch ball assembly 10 complies with safety specifications and requirements of DESC regulations V-5 and the hitch load rating equals or exceeds the trailer gross vehicle weight rating with which the self-locking hitch ball assembly 10 is utilized. Preferably, the threaded shank 14 has a diameter of ¾, 1 or 1¼ inches. When the self-locking hitch ball assembly 10 is secured to a draw bar/ball mount head, an assembly with a ¾ inch shank 14 is preferably torqued to 120 ft. lb. while a hitch ball assembly with a 1 or 1¼ inch shank is torqued to 200 ft. lb.

Figure 2:
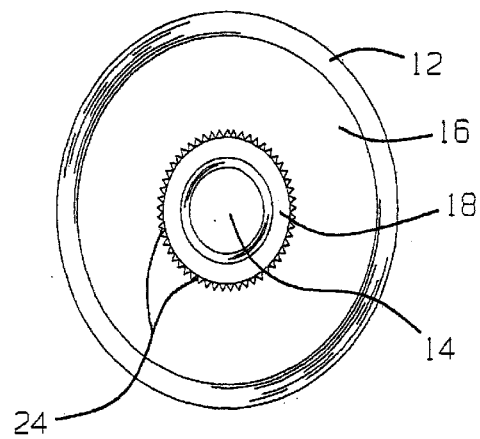
FIG. 2 is a bottom plan view of the hitch ball assembly shown in FIG. 1 with the nut and locking washer removed to show the serrations or teeth of the locking element extending along the mounting shank.

As best shown with reference to FIG. 2, the locking element 18 of the self-locking hitch ball assembly 10 includes multiple radially projecting serrations or teeth 24. Preferably, the locking element includes 10–70 teeth, each individual tooth having a longitudinal length of between ⅜–1 inch. The locking element 18 may be integrally forged with the mounting shank 14 or separately formed and then welded to the shank. The locking element 18 may be formed from hardened steel if desired. Preferably, 1008 to 1020 alloy steel is utilized.

Figure 3A:
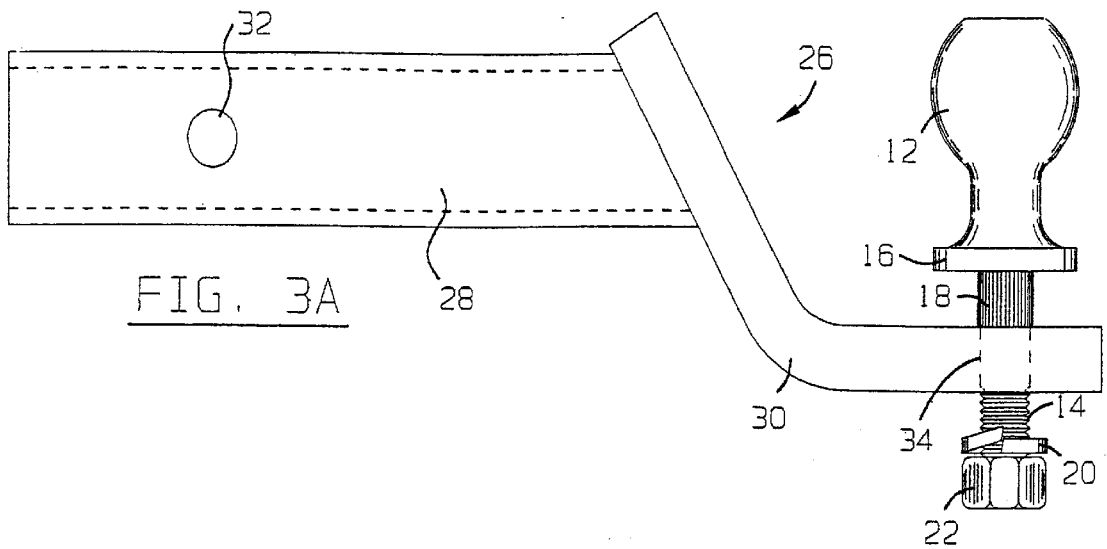
FIGS. 3a–c are side elevational views showing the installation of the hitch ball assembly on a hitch ball receiving and carrying member.
Figure 3B:
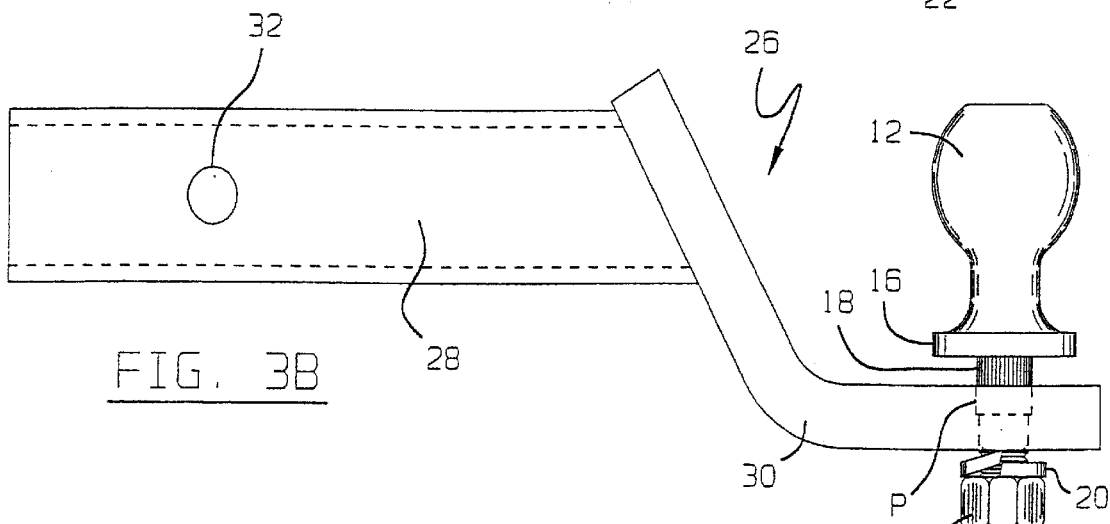
Figure 3C:
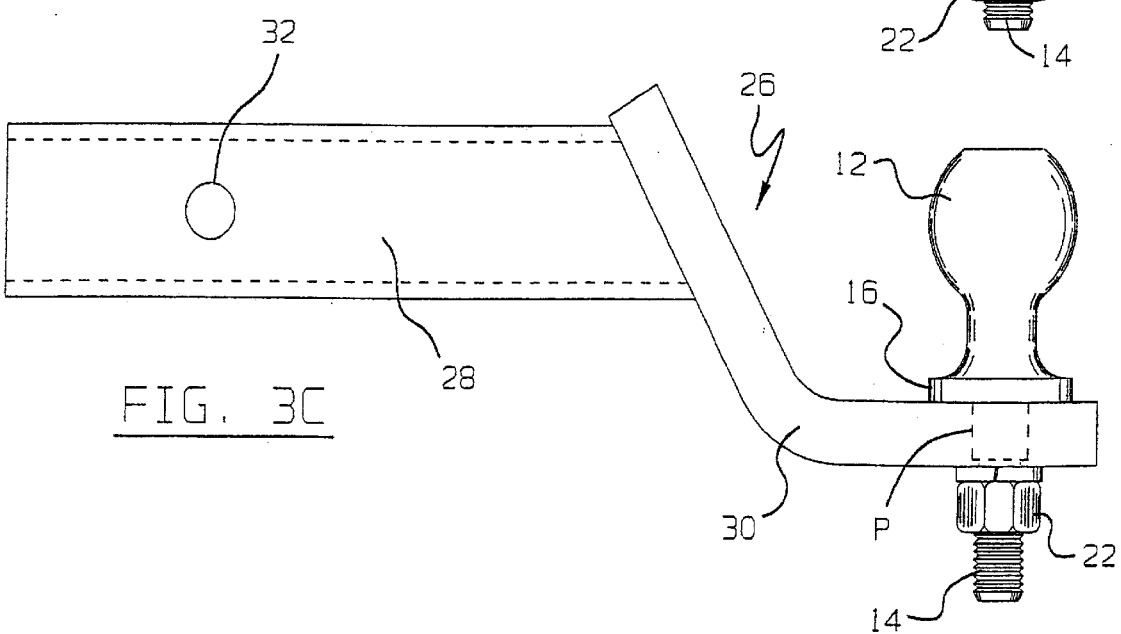

Reference is now made to FIGS. 3a–c showing installation of the self-locking hitch ball assembly 10 of the present invention on a hitch ball receiving and carrying member 26. The hitch ball receiving and carrying member 26 is shown to comprise a draw bar 28 including an integral form of ball mount head 30. As is known in the art, the draw bar 28 is inserted or plugged into a receiver box of a trailer hitch receiver (not shown) secured to a towing vehicle. A locking pin is inserted into aligned locking pin receiving apertures in the walls of the receiver box and the locking pin receiver aperture 32 in the walls of the draw bar 28. As shown in FIG. 3a, lock washer 20 and nut 22 are removed from the shank 14 and the shank is inserted through the hitch ball mounting aperture 34 formed in the ball mount head 30. As should be appreciated, the hitch ball assembly 10 is provided with the radially projecting locking element 18 along the shank 14. The locking element 18 has a diameter A while the hitch ball mounting aperture 34 has a diameter B wherein the diameter B is less than the diameter A. Accordingly, when the hitch ball assembly 10 is first positioned with the threaded mounting aperture 14 engaging in the hitch ball mounting aperture 34, the bottom end of the locking element 18 supports the hitch ball assembly 10.

Next, the lock washer 20 and nut 22 are positioned on the distal or threaded end of the mounting shank 14. As the nut 22 is tightened the radially projecting teeth 24, having a diameter greater than the mounting aperture 34, form or cut a mating periphery in the hitch ball receiving and carrying member 26 about the hitch ball mounting aperture 34 (see FIG. 3b). The engagement between the teeth 24 of the locking element 18 and the mating periphery cut in the wall of the hitch ball receiving and carrying member 30 defining the mounting aperture 34 positively prevents relative rotation of the mounting shank 14 and hitch ball assembly 10 with respect to the member 30. Accordingly, there is no requirement to use a second tool in order to secure the hitch ball assembly 10 against rotation as the nut 22 is tightly secured to the threaded shank 14. Since only one tool is required for installation, installation convenience is significantly enhanced. Further, since the nut 22 should be torqued between 120–200 ft. lb. the freeing of both hands of the individual for operation of an appropriate torque wrench is a significant benefit.

When fully secured as shown in FIG. 3c, the base 16 of the hitch ball is seated against the hitch ball receiving and carrying member 26, the teeth 24 of the locking element 18 have cut a mating periphery P in the wall of the ball mount head 30 defining the hitch ball mounting aperture 34 and the nut 22 is properly torqued to secure the entire self-locking hitch ball assembly 10 in position.

Advantageously, it should be appreciated that the hitch ball assembly 10 may be readily retrofit to hitch ball receiving and carrying members 26 already in the field. Specifically, locking element 18 and its teeth 24 are formed from steel capable of forming or cutting a mating periphery in the hitch ball receiving and carrying member 26 to which the assembly 10 is being secured. In this way, it is possible for the first time to provide an anti-rotation hitch ball that may be utilized with draw bars and ball mount heads already in the field. Thus, successful retrofitting that fully solves the hitch ball rotation problem is provided for the first time.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

In the claims:

1. A self-locking hitch ball assembly, comprising:
   a hitch ball;
   a mounting shank extending from said hitch ball;
   a hardened steel cutting and locking element along said shank for cutting a mating periphery in substantially any hitch ball receiving and carrying member to which said hitch ball assembly is mounted; and
   a fastener for engaging said mounting shank so as to secure said hitch ball assembly in position.

2. The self-locking hitch ball set forth in claim 1, wherein said locking element includes multiple radially projecting teeth.

3. The self-locking hitch ball set forth in claim 2, wherein a distal end of said mounting shank is threaded and said fastener is a cooperating nut.

4. The self-locking hitch ball set forth in claim 1 wherein said hardened steel cutting and locking element is made from 1008–1020 alloy steel.

5. A trailer hitch assembly, comprising:
   a hitch ball receiving and carrying member including a hitch ball mounting aperture;
   a hitch ball;
   a mounting shank extending from said hitch ball for receipt in said hitch ball mounting aperture;
   a hardened steel cutting and locking element along said shank for cutting a mating periphery in said hitch ball receiving and carrying member about said hitch ball mounting aperture; and
   a fastener for engaging said mounting shank so as to secure said hitch ball assembly in position.

6. The trailer hitch assembly set forth in claim 5, wherein said locking element includes multiple radially projecting teeth.

7. The trailer hitch assembly set forth in claim 6, wherein a distal end of said mounting shank is threaded and said fastener is a cooperating nut.

8. The trailer hitch assembly set forth in claim 7, wherein said hitch ball receiving and carrying member is a draw bar.

9. The trailer hitch assembly set forth in claim 7, wherein said hitch ball receiving and carrying member is a ball mount head carried on a hitch bar.

10. The self-locking hitch ball set forth in claim 5 wherein said hardened steel cutting and locking element is made from 1008–1020 alloy steel.

11. A method for preventing relative rotation between a threaded mounting shank of a hitch ball and a hitch ball receiving and carrying member comprising:
    providing a radially projecting cutting and locking element along said shank having a diameter A;
    engaging said threaded mounting shank in a hitch ball mounting aperture formed in said hitch ball receiving and carrying member, said hitch ball mounting aperture having a diameter B wherein diameter B is less than diameter A; and
    tightening a fastener on said threaded mounting shank whereby said locking element cuts a mating periphery in said hitch ball receiving and carrying member about said hitch ball mounting aperture.

* * * * *